US006704687B2

(12) United States Patent
Turicchi, Jr. et al.

(10) Patent No.: US 6,704,687 B2
(45) Date of Patent: Mar. 9, 2004

(54) HISTORICAL RESULTS BASED METHOD FOR AUTOMATICALLY IMPROVING COMPUTER SYSTEM PERFORMANCE

(75) Inventors: Thomas Edwin Turicchi, Jr., Dallas, TX (US); Francisco J. Romero, Plano, TX (US); Doug Grumann, Citrus Heights, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 614 days.

(21) Appl. No.: 09/773,120

(22) Filed: Jan. 31, 2001

(65) Prior Publication Data

US 2002/0103624 A1 Aug. 1, 2002

(51) Int. Cl.[7] ............................................... G06F 15/00
(52) U.S. Cl. ....................................... 702/182; 713/100
(58) Field of Search .................. 713/100; 702/182–186

(56) References Cited

U.S. PATENT DOCUMENTS 5,696,701 A * 12/1997 Burgess et al. ............... 714/25
6,505,249 B1 * 1/2003 Rehkopf ....................... 709/224
6,628,994 B1 * 9/2003 Turicchi, Jr. et al. .......... 700/32

* cited by examiner

Primary Examiner—Thomas M. Heckler

(57) ABSTRACT

A method for determining appropriate adjustments of computer system parameter values in order to improve system performance. The method for this determination is based on historical performance data. Methods are disclosed which involve measuring current system performance and retrieving paired stored values of measured system performance and a selected system parameter. The decision as to whether or not to adjust the value of the selected system parameter is based on performing a trend analysis on the paired values. When such changes are made, subsequent measurement of system performance is performed and beneficial changes are implemented.

16 Claims, 3 Drawing Sheets

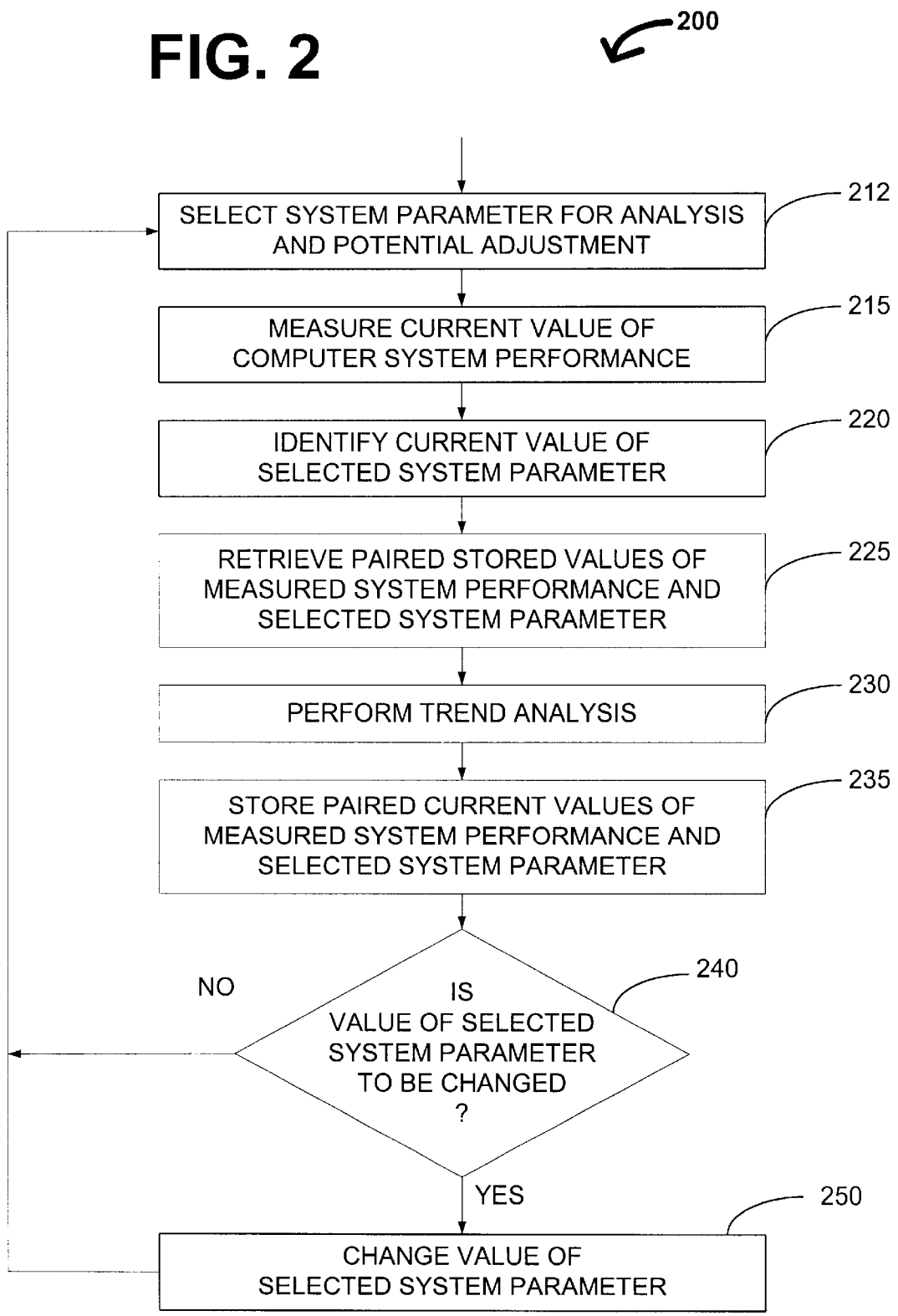

|  | First Parameter | | | | |
|---|---|---|---|---|---|
|  |  | $P_1(1)$ | $P_1(2)$ | $P_1(3)$ | $P_1(4)$ | $P_1(5)$ |
| Second Parameter | $P_2(1)$ | $S(1,1)$ | $S(2,1)$ | $S(3,1)$ | $S(4,1)$ | $S(5,1)$ |
| | $P_2(2)$ | $S(1,2)$ | $S(2,2)$ | $S(3,2)$ | $S(4,2)$ | $S(5,2)$ |
| | $P_2(3)$ | $S(1,3)$ | $S(2,3)$ | $S(3,3)$ | $S(4,3)$ | $S(5,3)$ |
| | $P_2(4)$ | $S(1,4)$ | $S(2,4)$ | $S(3,4)$ | $S(4,4)$ | $S(5,4)$ |

FIG. 3

HISTORICAL RESULTS BASED METHOD FOR AUTOMATICALLY IMPROVING COMPUTER SYSTEM PERFORMANCE

FIELD OF THE INVENTION

The present invention relates generally to computer systems and, more particularly, to the automatic adjustment of parameters to values that result in optimal system performance even as the workload on the system continues to change.

BACKGROUND OF THE INVENTION

Administrators of modern computing systems generally have various parameters available that can be adjusted or configured to values that result in improved performance of the system. Size of swap space, memory dedicated to buffer-cache, maximum number of processes permitted, and maximum application data size are examples of such parameters that could be so adjusted.

With limited success, various techniques have been used to make these parameter adjustments. One common solution to this problem is for the administrator or operator to learn the details of the inner workings or operation of each application, and then speculate as to the optimal configuration of the computer system. This approach has several disadvantages: (1) it is extremely time consuming, especially since it must be repeated as each new application or workload is brought into the system, (2) there is frequently insufficient data available from the vendor of the applications to do this with any precision, (3) it is an error prone process as there are often unforseen dependencies that make such speculation highly inaccurate, and (4) optimal system parameter values can be dependent upon application usage characteristics, which can vary from time to time.

Another solution to this problem is to build a separate mechanism for each system parameter that influences system performance and that can be adjusted. Each such mechanism would have the capability of measuring system metrics and evaluating whether or not a change in the parameter controlled by that mechanism is called for. For example, such a mechanism could control a system's virtual memory and could detect when the system either has or is in danger of running out of virtual memory. The mechanism could then recommend that the system be reconfigured to increase virtual memory. One problem with this approach is that a separate mechanism must be created for each system parameter that it is desirable to control.

Thus, there is a need for a method by which a computer system can be more effectively and efficiently improved. In particular, there is a need for a method to automatically and continually adjust system parameters to obtain improved system performance, even as the workload on the system changes.

SUMMARY OF THE INVENTION

The present patent document relates to a novel method for improving computer system performance by the adjustment of computer system parameters. This method can make appropriate adjustments even as the workload on the system changes. The method takes advantage of historical data regarding computer system performance and values of computer system parameters. Methods of selecting a new parameter value based upon this data are described including, but not limited to least squares line and curve fitting.

The methods describe comprise (1) selecting a computer system parameter for analysis and potential adjustment, (2) measuring the current value of computer system performance, (3) identifying the current value of a selected computer system parameter, (4) retrieving paired stored values of measured computer system performance and associated selected computer system parameter, (5) performing a trend analysis is performed on the paired values of computer system performance and selected computer system parameter, (6) storing the current paired current values of the measured computer system performance and the selected computer system parameter, (7) deciding whether or not to change the selected computer system parameter, and (8) if the decision is to change the value of the selected computer system parameter, making that change. This process can be repeated for other computer system parameters. In representative embodiments, tables for maintaining and displaying computer system parameter values and measured computer system performance are described.

While embodiments disclosed in the present patent document refer to automatic adjustment of computer system parameters, it should be recognized that such adjustments could be made by other means, as for example manually.

Representative embodiments as described in the present patent document are advantageous in that they take very little time or effort on the part of the system operator to arrive at an optimal or near optimal system configuration. Additionally, as the usage characteristics and load on the system change, this method finds and recommends improvements to the system, without requiring the operator to continuously monitor and redo previous adjustments that were performed by hand. Another benefit is that this mechanism can be used on a subset of the parameters available on a system. Thus, the operator may choose to use this method to look for improvements in obscure or less understood parameters, and make the macroscopic adjustments himself.

In addition, this method can be used "offline". This method can be employed on a development or benchmark instance of the application, instead of on the production version. Improved settings could be found with very consumption of operator time, and without risking adverse affects on a production system. The ideal settings obtained using the development system could then be adapted to the production system.

Other aspects and advantages of the present invention will become apparent from the following detailed description, taken in conjunction with the accompanying drawings, illustrating by way of example the principles of the invention.

BRIEF DESCRIPTION OF THE DRAWINGS

The accompanying drawings provide visual representations which will be used to more fully describe the invention and can be used by those skilled in the art to better understand it and its inherent advantages. In these drawings, like reference numerals identify corresponding elements and:

FIG. 2 is a drawing of a flow chart for a method for adjustment of computer system parameters as described in various representative embodiments of the present patent document.

FIG. 3 is a table of system performance for various combinations of values for a first computer parameter and a second computer system parameter as described in various representative embodiments of the present patent document.

DETAILED DESCRIPTION OF THE PREFERRED EMBODIMENTS

Figure 1A:
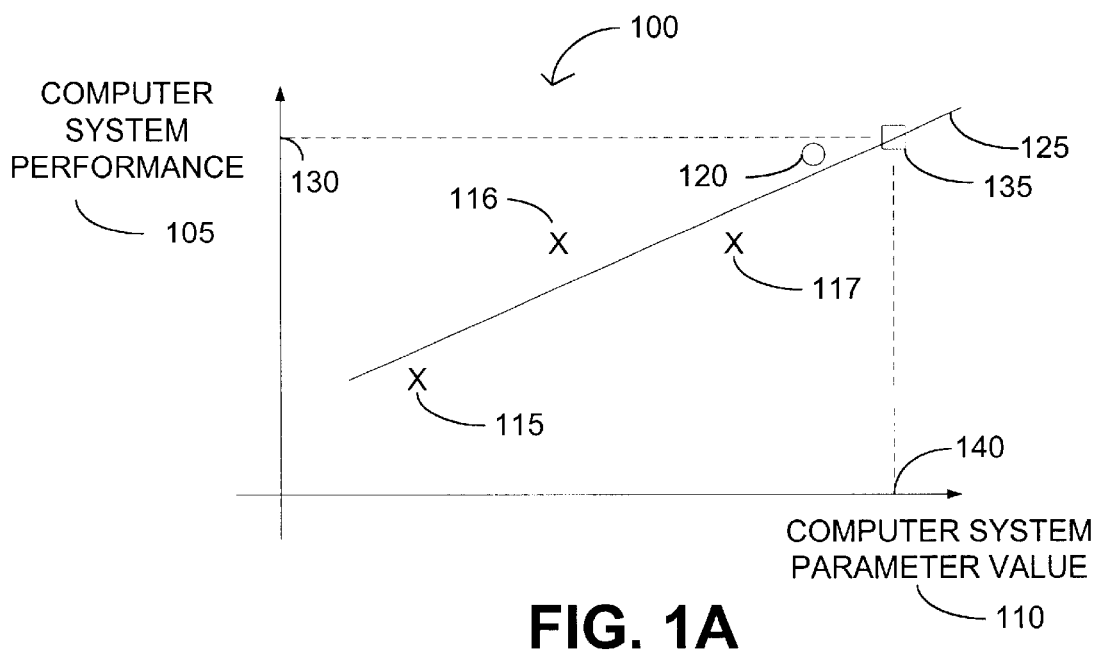
FIG. 1A is an example graph of computer system performance vs. computer system parameter value as described in various representative embodiments of the present patent document.

As shown in the drawings for purposes of illustration, the present patent document relates to a novel method for improving computer system performance by the adjustment of computer system parameters. This method can make appropriate adjustments even as the workload on the system changes. Previous methods for improving system performance have relied upon speculation as to the optimal system configuration or by independently controlling individual system parameters. In the following detailed description and in the several figures of the drawings, like elements are identified with like reference numerals.

FIG. 1A is an example graph 100 of computer system performance 105 vs. computer system parameter value 110 as described in various representative embodiments of the present patent document. The graph of FIG. 1A is an example of the type of data and techniques that could be used in adjusting computer system parameter values 110 in order to obtain improved computer system performance 105. The graph of FIG. 1A is for illustrative purposes only and should not be construed as limiting the claims of the present patent document. Previously measured values of computer system performance 105 for various computer system parameter values 110 are indicated by a first, second, and third data points 115,116,117 which in FIG. 1A are indicated by X's. Current measured value of computer system performance 105 for current computer system parameter value 110 is indicated by a current data point 120 which in FIG. 1A is indicated by a circle. A best fit line 125 is drawn using the four data points 115,116,117,120. The best fit line 125 could be obtained via trend analysis methods, including, but not limited to a visual best fit to the data and a sum of least squares. In the sum of least squares method, the best fit line 125 is obtained by minimizing the sum of the squares of the deviations of the data points 115,116,117,120 from the line 125.

In order to improve the performance of a computer system whose performance is plotted in FIG. 1A to a projected level 130, the best fit line 125 is extended to include this value. The projected computer system performance 130 intersects the best fit line 125 at projected data point 135 having projected computer system parameter value 140. The computer system parameter value 110 is then adjusted to the projected computer system parameter value 140, and the computer system operated at that value. Measurements of computer system performance 105 could then be made to confirm the projection just made. Additional improvements could then be made by repeating the above procedures. However, should the computer system performance 105 obtained be less than that previously obtained, appropriate adjustment to the computer system parameter value 110 could then be made to return the system to a greater performance level.

Figure 1B:
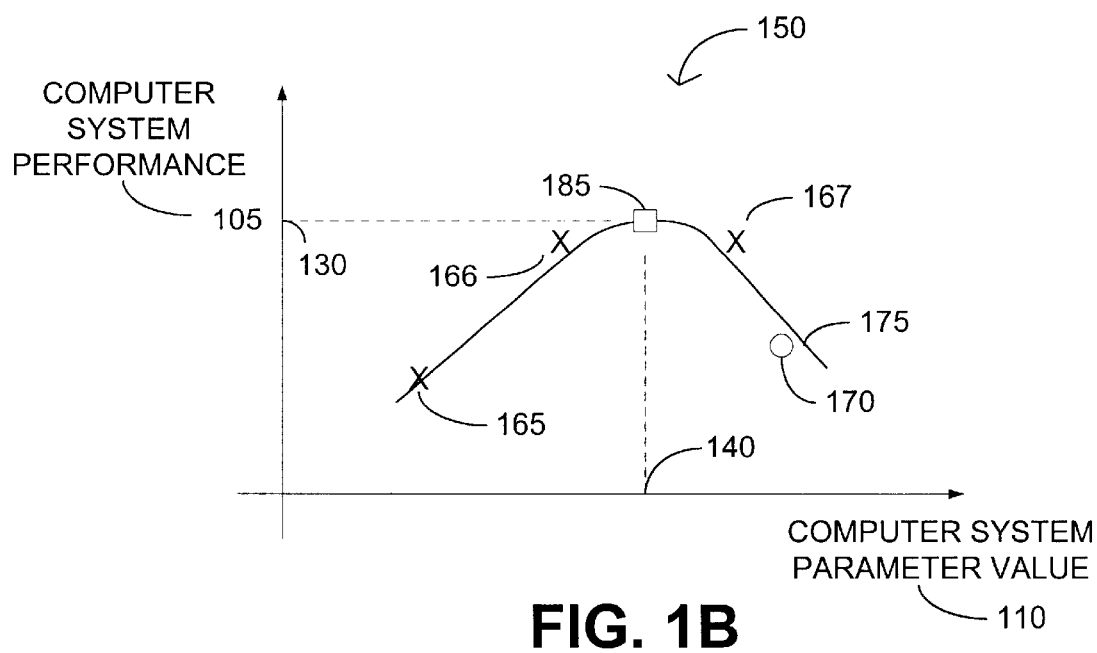
FIG. 1B is another example graph of computer system performance vs. computer system parameter value as described in various representative embodiments of the present patent document.

FIG. 1B is another example graph 150 of computer system performance 105 vs. computer system parameter value 110 as described in various representative embodiments of the present patent document. The graph of FIG. 1B is another example of the type of data and techniques that could be used in adjusting computer system parameter values 110 in order to obtain improved computer system performance 105. The graph of FIG. 1B is for illustrative purposes only and should not be construed as limiting the claims of the present patent document. Previously measured values of computer system performance 105 for various computer system parameter values 110 are indicated by a first, second, and third data points 165,166,167 which in FIG. 1B are indicated by X's. Current measured value of computer system performance 105 for current computer system parameter value 110 is indicated by a current data point 170 which in FIG. 1B is indicated by a circle. A best fit curve 175 is drawn using the four data points 165,166, 167,170. The best fit curve 175 could be obtained via different trend analysis methods, including, but not limited to a visual best fit to the data and a sum of least squares for a polynomial curve. The polynomial could comprise linear, square, and higher order terms. In the sum of least squares method, the best fit curve 175 is obtained by minimizing the sum of the squares of the deviations of the data points 165,166,167,170 from the curve 175.

In order to improve the performance of a computer system whose performance is plotted in FIG. 1B to the projected level 130, the best fit curve 175 is extended if need be to include this value. The projected computer system performance 130 intersects the best fit curve 175 at projected data point 185 having projected computer system parameter value 140. The computer system parameter value 110 is then adjusted to the projected computer system parameter value 140, and the computer system operated at that value. Measurements of computer system performance 105 could then be made to confirm the projection just made. Additional improvements could then be made by repeating the above procedures. However, should the computer system performance 105 obtained be less than that previously obtained, appropriate adjustment to the computer system parameter value 110 could then be made to return the system to a greater performance level.

FIG. 2 is a drawing of a flow chart 200 for a method for adjustment of computer system parameters 110 as described in various representative embodiments of the present patent document. In block 212 of FIG. 2, a computer system parameter 110 is selected for analysis and potential adjustment. Block 212 then transfers control to block 215.

In block 215, a current value of computer system performance 105 is measured. Block 215 then transfers control to block 220.

In block 220 the current value of the selected computer system parameter 110 is identified. This identification could be obtained, for example, via a measurement of the parameter 110, a dial setting, a stored value, or by other means. Block 220 then transfers control to block 225.

In block 225 paired stored values of measured computer system performance 105 and the selected computer system parameter 110 are retrieved. These paired values could be obtained, for example, by reading their values from a file, a database, from active computer memory, or by other means. The paired values retrieved could be limited by various criteria including, but not limited to, the age of the data selected. Block 225 then transfers control to block 230.

In block 230 a trend analysis is performed on the paired values of computer system performance 105 and selected computer system parameter 110. This trend analysis could be performed as previously discussed in reference to FIGS. 1A and 1B. Block 230 then transfers control to block 235.

In block 235 the paired current values of the measured computer system performance 105 and the selected computer system parameter 110 are stored. These values could be, for example, stored in a file, a data base, in active computer system memory, or other means. Block 235 then transfers control to block 240.

In block 240 a decision is made as to whether or not to change the selected computer system parameter 110. This decision could be made based upon various criteria including, but not limited to, the deviation from the optimum or improved computer system performance 105 from the current value as indicated by the best fit line or curve. If the value of the selected system parameter 110 is to be changed, block 240 then transfers control to block 250. Otherwise, block 240 transfers control to block 212.

In block 250 the value of the selected computer system parameter 110 is changed. Block 250 then transfers control to block 212.

FIG. 3 is a table 300 of computer system performance 105 for various combinations of values for a first computer system parameter 311 and a second computer system parameter 312 as described in various representative embodiments of the present patent document. The data of FIG. 3 is representative of a computer system having two significant parameters 311,312 or in which other computer system parameters 110 are constant or whose variability has little effect upon the computer system performance 105 obtained. In the first row under the "First Parameter" 311 heading are listed various values—$P_1(1), P_1(2), P_1(3), \ldots$ —for the first computer system parameter 311. In the first column to the right of the column containing the heading "Second Parameter" 312 are listed various values—$P_2(1), P_2(2), P_2(3), \ldots$ —for the second computer system parameter 312. While at the intersection of the column representing the ith value for the first parameter $P_1(I)$ and the row representing the jth value for the second parameter $P_2(j)$, the computer system performance 105 obtained for the combination of those two system parameters is the $S(i,j)$.

However, in practical computer systems the problem is generally more complex with several significant computer system parameters 110 affecting computer system performance 105 as expressed in the following equation:

$$S(P_1(I), P_2(j), P_3(k), \ldots) = f(P_1(I), P_2(j), P_3(k), \ldots) \quad (1)$$

indicating that the computer system performance 105 is a function of the values of various computer system parameters 110.

Computer system performance 105 could then be described by a set of tables as in FIG. 3 for various combinations of two computer system parameters 311,312 wherein the remainder of the computer system parameters 110 have constant or nearly constant values for each of the computer system performance values 105 indicated in a given table. In a representative embodiment, analysis and adjustment of selected computer system parameters 110 would be performed as shown in FIG. 2.

While embodiments disclosed in the present patent document refer to automatic adjustment of computer system parameters, it should be recognized that such adjustments could be made by other means, as for example manually. However, some of the advantages disclosed herein would not be optimized were the system to be implemented with other than automatic adjustment.

Representative embodiments as described in the present patent document are advantageous in that they take very little time or effort on the part of the system operator to arrive at an optimal or near optimal system configuration. Additionally, as the usage characteristics and load on the system change, this method finds and recommends improvements to the system, without requiring the operator to continuously monitor and redo previous adjustments that were performed by hand. Another benefit is that this mechanism can be used on a subset of the parameters available on a system. Thus, the operator may choose to use this method to look for improvements in obscure or less understood parameters, and make the macroscopic adjustments himself.

In addition, this method can be used "offline". This method can be employed on a development or benchmark instance of the application, instead of on the production version. Improved settings could be found with very consumption of operator time, and without risking adverse affects on a production system. The ideal settings obtained using the development system could then be adapted to the production system.

It should also be noted that the permissible adjustments for some computer system parameters 110 maybe made only in discrete values, as for example the addition of active computer memory.

While the present invention has been described in detail in relation to representative embodiments thereof, the described embodiments have been presented by way of example and not by way of limitation. It will be understood by those skilled in the art that various changes may be made in the form and details of the described embodiments resulting in equivalent embodiment that remains within the scope of the appended claims.

What is claimed is:

1. A method for improving computer system performance, comprising the steps of:

selecting a computer system parameter;

measuring current value of computer system performance;

identifying current value of the selected system parameter;

retrieving at least one stored pair of values of measured computer system performance and the selected system parameter;

performing a trend analysis using paired values of measured computer system performance and selected system parameter;

evaluating whether or not to change the value of the selected system parameter; and when evaluation step indicates the value of the selected system parameter should be changed, changing value of the selected system parameter.

2. A method as recited in claim 1, which further comprises the step of:

storing paired current values of the measured computer system performance and the selected system parameter.

3. A method as recited in claim 1, providing the paired values of computer system performance and selected system parameter are stored in a data base.

4. A method as recited in claim 1, providing the value used for the current computer system performance is an average of computer system performance over a preselected period of time.

5. A method as recited in claim 1, providing the trend analysis uses the method of least squares to fit a straight line to the computer system performance vs. value of the selected system parameter.

6. A method as recited in claim 1, providing the trend analysis uses the method of least squares to fit a polynomial curve to the computer system performance vs. value of the selected system parameter.

7. A method as recited in claim 1, providing at least one system parameter is selected from the group consisting of size of swap space, buffer-cache memory, maximum number of permitted processes, and maximum application data size.

8. A method as recited in claim 1, providing the measure of computer system performance is selected from the group consisting of response time of a software process.

9. A program storage medium readable by a computer, tangibly embodying a software program of instructions executable by the computer to perform method steps for computer system performance improvement, the method steps comprising:

selecting a computer system parameter;

measuring current value of computer system performance;

identifying current value of the selected system parameter;

retrieving at least one stored pair of values of measured computer system performance and the selected system parameter;

performing a trend analysis using paired values of measured computer system performance and selected system parameter;

evaluating whether or not to change the value of the selected system parameter; and when evaluation step indicates the value of the selected system parameter should be changed, changing value of the selected system parameter.

10. A program storage medium as recited in claim 9, wherein the method steps further comprise:

storing paired current values of the measured computer system performance and the selected system parameter.

11. A program storage medium as recited in claim 9, providing the paired values of computer system performance and selected system parameter are stored in a data base.

12. A program storage medium as recited in claim 9, providing the value used for the current computer system performance is an average of computer system performance over a preselected period of time.

13. A program storage medium as recited in claim 9, providing the trend analysis uses the method of least squares to fit a straight line to the computer system performance vs. value of the selected system parameter.

14. A program storage medium as recited in claim 9, providing the trend analysis uses the method of least squares to fit a polynomial curve to the computer system performance vs. value of the selected system parameter.

15. A program storage medium as recited in claim 9, providing at least one system parameter is selected from the group consisting of size of swap space, buffer-cache memory, maximum number of permitted processes, and maximum application data size.

16. A program storage medium as recited in claim 9, providing the measure of computer system performance is selected from the group consisting of response time of a software process.

* * * * *